United States Patent
Nguyen

(10) Patent No.: US 10,808,871 B2
(45) Date of Patent: Oct. 20, 2020

(54) HIGH PRESSURE FLOWLINE UNION

(71) Applicant: Cantex International, Inc., Houston, TX (US)

(72) Inventor: Duy D. Nguyen, Cypress, TX (US)

(73) Assignee: Cantex International, Inc., Houston, TX (US)

( * ) Notice: Subject to any disclaimer, the term of this patent is extended or adjusted under 35 U.S.C. 154(b) by 476 days.

(21) Appl. No.: 15/377,509

(22) Filed: Dec. 13, 2016

(65) Prior Publication Data

US 2018/0163904 A1    Jun. 14, 2018

(51) Int. Cl.
*F16L 19/02* (2006.01)
*E21B 17/042* (2006.01)
*E21B 43/26* (2006.01)
*B25B 13/50* (2006.01)

(52) U.S. Cl.
CPC ...... *F16L 19/0218* (2013.01); *B25B 13/5008* (2013.01); *E21B 17/042* (2013.01); *F16L 19/0206* (2013.01); *F16L 19/0231* (2013.01); *E21B 43/26* (2013.01); *Y10T 29/49826* (2015.01)

(58) Field of Classification Search
CPC .............. F16L 19/0218; F16L 19/0206; F16L 19/0231; F16L 19/025; F16L 19/04; F16L 19/05; F16B 33/02; B25B 13/5008; E21B 17/042; E21B 43/26
USPC .......................... 285/354, 386, 388; 411/435
See application file for complete search history.

(56) References Cited

U.S. PATENT DOCUMENTS

| | | | |
|---|---|---|---|
| 4,838,583 A | 6/1989 | Babuder et al. | |
| 4,867,483 A | 9/1989 | Witt et al. | |
| 5,775,743 A * | 7/1998 | Rochelle ............. | F16L 19/0231 285/354 |
| 6,945,569 B1 | 9/2005 | Diaz et al. | |

(Continued)

FOREIGN PATENT DOCUMENTS

WO    2014/042643 A1    3/2014

OTHER PUBLICATIONS

PCT/US2017/065452, Invitation to Pay Additional Fees and, Where Applicable, Protest Fee (dated Mar. 29, 2018).

(Continued)

*Primary Examiner* — Matthew Troutman
*Assistant Examiner* — William S. Choi
(74) *Attorney, Agent, or Firm* — Keith B. Willhelm

(57) ABSTRACT

A union joins male and female subs of two flowline components. The male sub includes a male end of one component, a retainer collar, and a union nut. An annular boss extends around a union face of the male end and provides a rearward-facing shoulder. The retainer collar is carried on the male end and has a forward-facing shoulder and a rearward-facing shoulder. The collar forward-facing shoulder bears on the male end rearward-facing shoulder. The female sub includes a threaded female end of the other component. The nut is carried on the male end around the collar and threads onto the female end. It also has a forward-facing shoulder which bears on the collar rearward-facing shoulder. The nut forward-facing shoulder and the collar rearward-facing shoulder are beveled. Thus, load from the nut is transmitted through the collar axially to the annular boss and radially inward to the male end.

30 Claims, 9 Drawing Sheets

(56) References Cited

U.S. PATENT DOCUMENTS

| | | |
|---|---|---|
| 7,793,989 B2 | 9/2010 | Pinckney, Jr. |
| 8,007,013 B2 | 8/2011 | Arstein et al. |
| 8,205,916 B2 | 6/2012 | Dallas et al. |
| 8,833,733 B2 | 9/2014 | Bogert et al. |
| 8,833,804 B2 | 9/2014 | Myers et al. |
| 8,985,640 B2 | 3/2015 | Leng |
| 9,097,369 B2 | 8/2015 | McGuire |
| 9,400,070 B2 | 7/2016 | Anton et al. |
| 9,435,470 B2 | 9/2016 | Okabe et al. |
| 2002/0190523 A1 | 12/2002 | Berghaus |
| 2003/0127848 A1* | 7/2003 | Campbell ............... F16L 58/08 285/368 |
| 2004/0021319 A1 | 2/2004 | Richardson et al. |
| 2005/0082829 A1 | 4/2005 | Dallas |
| 2009/0160186 A1 | 6/2009 | McGuire |
| 2014/0284919 A1 | 9/2014 | Goto et al. |
| 2015/0226355 A1 | 8/2015 | Ungchusri |

OTHER PUBLICATIONS

FMC Technologies, *Flowline Products and Services*, V.102512 (undated).

FMC Technologies, *Weco 3" 1505 Hammer Union* (Copyright 2014).

GRAYLOC Products, *Dwg No. H800307-2209* (Release Date May 4, 2016).

Schlumberger, *Weco Hammer Unions—Mismatched Unions Have Caused Fatal Accidents* (undated).

Torquelock Corporation, *Patent Issues for Threaded Pipe Connection with a Pressurized Energized Flex-Seal*, Journal of Engineering 1602 (Apr. 8, 2015).

Valourec Oil and Gas France, *Researchers Submit Patent Application, Tubular Threaded Joint Having Improved High Torque Perlbrmance*, Energy Weekly News 1590 (Oct. 17, 2014).

\* cited by examiner

HIGH PRESSURE FLOWLINE UNION

FIELD OF THE INVENTION

The present invention relates in general to unions for connecting components of temporary pipe and flow line installations, and especially, to unions which may be used in high-pressure flow lines common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer, and thus, the porous layer forms an area or reservoir in which hydrocarbons will collect. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections referred to as a drill string. The drill string is suspended from a derrick and rotated by a motor in the derrick. A drilling fluid or "mud" is pumped down the drill string, through the bit, and into the well bore. This fluid serves to lubricate the bit and carry cuttings from the drilling process back to the surface. As the drilling progresses downward, the drill string is extended by adding more pipe sections.

When the drill bit has reached the desired depth, larger diameter pipes, or casings, are placed in the well and cemented in place to prevent the sides of the borehole from caving in. Cement is introduced through a work string. As it flows out the bottom of the work string, fluids already in the well, so-called "returns," are displaced up the annulus between the casing and the borehole and are collected at the surface.

Once the casing is cemented in place, it is perforated at the level of the oil-bearing formation to create openings through which oil can enter the cased well. Production tubing, valves, and other equipment are installed in the well so that the hydrocarbons may flow in a controlled manner from the formation, into the cased well bore, and through the production tubing up to the surface for storage or transport.

This simplified drilling and completion process, however, is rarely possible in the real world. Hydrocarbon bearing formations may be quite deep or otherwise difficult to access. Thus, many wells today are drilled in stages. An initial section is drilled, cased, and cemented. Drilling then proceeds with a somewhat smaller well bore which is lined with somewhat smaller casings or "liners." The liner is suspended from the original or "host" casing by an anchor or "hanger." A seal also is typically established between the liner and the casing and, like the original casing, the liner is cemented in the well. That process then may be repeated to further extend the well and install additional liners. In essence, then, a modern oil well typically includes a number of tubes telescoped wholly or partially within other tubes.

Moreover, hydrocarbons are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

One technique involves drilling a well in a more or less horizontal direction, so that the borehole extends along a formation instead of passing through it. More of the formation is exposed to the borehole, and the average distance hydrocarbons must flow to reach the well is decreased. Another technique involves creating fractures in a formation which will allow hydrocarbons to flow more easily. Indeed, the combination of horizontal drilling and fracturing, or "frac'ing" or "fracking" as it is known in the industry, is presently the only commercially viable way of producing natural gas from the vast majority of North American gas reserves.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is injected into the formation, fracturing it and creating flow paths to the well. The proppant serves to prevent fractures from closing when pumping is stopped.

A formation typically will be fractured in many different locations or zones, but rarely, if ever, will it be fractured all at once. A liner first will be installed in the well. The liner will incorporate valves, or the liner may be perforated in a first zone near the bottom of the well. Fluids then are pumped into the well to fracture the formation in the vicinity of the bottom perforations. After the initial zone is fractured, a plug is installed in the liner at a point above the fractured zone. The liner is perforated again, this time in a second zone located above the plug. That process is repeated for zones further up the formation until the formation has been completely fractured.

Once the well is fractured, the large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines S in a frac manifold 9. The low-pressure lines 8 in frac manifold 9 teed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

Most of those units are transported to the well site on skids, trailers, or trucks. Except for conveyers 4 feeding sand into blender 6, however, all of the units are connected by one kind of fluid conduit or another. The conduits running between units typically are connected or assembled on site. The conduits upstream of pumps 10 are under relatively low pressure. They typically will be flexible hoses, such as blender hoses 7 and suction hoses 11. On the other hand, conduits downstream from pumps 10 and leading from the well, such as discharge lines 12 and flow lines 14, will be subject to extremely high pressures and must be more rugged.

Because frac systems are required at a site for a relatively short period of time, frac iron components are joined by unions. Unions allow the components to be connected ("made up") and disconnected ("broken down") relatively quickly. One very common type of union used to assemble components of high-pressure flow lines is the hammer union. Though spoken of in terms that may imply they are discreet components, unions are actually interconnected subassemblies of the components joined by the union. A male sub will be on one component, and a mating female sub will be on the other. The subs of hammer unions may be secured together with a nut carried on the male sub. Their name derives from the fact that the nut has protruding lugs which may be struck by a hammer to make up (tighten) or break down (loosen) the connection between the subs.

Hammer unions were originally sold under the Weco® trademark. Though they are sold today by many companies, they still are referred to as "Weco-style" unions. Typically, they are denominated by nominal pipe diameter and a figure number which derives from the original Weco model numbers and design configurations. One very common hammer union is the Weco 1502 union.

A 1502 union 20 is shown in FIG. 2 as connecting two straight pipe components or pup joints 21a and 21b. Each pup joint 21 has a male sub 30 at one end portion, the male end 31, and a female sub 40 at the other end portion, the female end 41. Pup joints 21 are identical, although certain components of each have been omitted from FIG. 2A for the purposes of exposition. With that in mind, it will be understood that a plurality of retainer segments 50 are arranged circumferentially around an external groove 32 in the male end 31. They are secured together by a snap ring 51 which fits into corresponding grooves at one of their ends. Segments 50 may be visualized as a loose-fitting collar having an annular boss 52 at the other end. A union nut 60 is carried on the retainer segments 50. Segments 50 keep nut 60 on male sub 30, and together with nut 60 can slide back and forth a substantial distance in groove 32.

Male ends 31 and female ends 41 have, respectively, mating primary bearing surfaces 35 and 45 at the ends thereof. Union nuts 60 have internal threads 62, while female subs 40 have external threads 42. Female ends 41 are provided with an elastomeric seal 46 carried in a groove 47. As seen best in FIG. 2B, seal 46 is provided with a small, radially projecting annular lip which extends into a smaller, narrow groove in groove 47 and helps secure seal 46 in female end 41. Male ends 31 have a secondary bearing surface 36 extending from primary bearing surface 35.

Thus, pup joints 21 may be connected by threading union nut 60 of pup joint 21a onto female sub 40 of pup joint 21b. Primary bearing surfaces 35 and 45 in, respectively, male end 31a and female end 41b will bear on each other, while secondary bearing surface 36 in male end 31a will bear on and compress elastomeric seal 44 in female end 41b. Compressive axial forces generated by the threaded engagement between nut 60 and female sub 40 will be transmitted to male end 31a through retainer segments 50.

Hammer unions may be made and broken down with relative ease. Their basic design is robust and reliable, and like other flowline components, they are fabricated from heavy, high tensile steel. Thus, they have been adapted for low pressure (1,000 to 2,000 psi), medium pressure (2,000 to 4,000 psi), and high pressure service (6,000 to 20,000 psi). The Weco 1502 union is rated for 15,000 psi, and therefore, is particularly suitable for high-pressure flow lines. Nevertheless, they can suffer leaks and even catastrophic failure in large part due to extremely harsh operating conditions.

Frac jobs have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Moreover, at least in the early stages of production, the flow back after fracturing also will be at high pressure and rates. The initial production stream from a fractured well flows at pressures in the range of from 3,000 to 5,000 psi, and more and more commonly up to 10,000 psi. The flow rates can approach a million cubic feet per hour or more.

Such pressures and flow rates, especially given the abrasive and corrosive nature of the fluids, will create relatively rapid erosion to which unions are particularly susceptible. Unlike the more laminar flow through a relatively long section of straight pipe, flow through a union may be quite turbulent. That turbulence will enhance both the abrasive and corrosive effects of fluids flowing through the connection. High pressures and flow rates also create vibrations through the flow line. Those vibrations create stress throughout the flow line, but especially at the unions.

Flowline components must be certified and periodically recertified as complying with rated specifications. Such harsh operating conditions, however, may cause damage or weakening of the components. Such damage may be difficult to detect, such as fatigue stress and microscopic fracturing, or may even lead to catastrophic failure. The 1502 Weco union, in particular, has various features and components that are especially susceptible to stress and erosion.

As noted, hammer unions are made up and broken down by hammering protruding lugs on the union nut. Though not necessarily viewed as a bad thing by workers assembling a flow line, who may use it to relieve their own internal stress, hammering the lugs may lead to over tightening of the union nut and excessive stress in the union. It also creates a risk of damage to the union and to the worker swinging the hammer.

Flowline components also are quite expensive, and the cost of repeatedly recertifying or replacing components can add significantly to operating costs of the system. Any failure of components on site can interrupt fracturing, potentially reducing its effectiveness and inevitably increasing the amount of time required to complete the operation. Thus, high-pressure flowline components are required to endure extremely abrasive fluids flowing at extremely high pressures and rates and, hopefully, to do so over an extended service life.

The statements in this section are intended to provide background information related to the invention disclosed and claimed herein. Such information may or may not constitute prior art. It will be appreciated from the foregoing, however, that there remains a need for new and improved high-pressure flowline unions and methods for connecting flowline components. Such disadvantages and others inherent in the prior art are addressed by various aspects and embodiments of the subject invention.

SUMMARY OF THE INVENTION

The subject invention, in its various aspects and embodiments, relates generally to unions for flowline components, and especially for high-pressure flow unions, and encompasses various embodiments and aspects, some of which are specifically described and illustrated herein. As will be appreciated from the full disclosure, various embodiments provide features which are designed to strengthen and support, and to better distribute stress through the union. Other embodiments provide features which provide better wear resistance through the union. Yet other embodiments provide features which provide for easier, more reliable assembly of unions and which reduce hazards to those assembling flow lines.

Broad embodiments of the novel unions may comprise a male sub of a first component and a female sub of a second component. The male sub comprises a male end of the first component, a segmented retainer collar, and a union nut. An annular boss extends radially outward around a union face of the male end. The boss provides a rearward-facing shoulder. The segmented retainer collar is carried on the male end. The collar has a forward-facing shoulder and a rearward-facing shoulder. The collar forward-facing shoulder bears on the male end rearward-facing shoulder. The female sub comprises a female end of the second component. The female end has external threads.

The union nut is carried on the male end around the collar. It has internal threads engaging the external threads on the female end. It also has a forward-facing shoulder. The forward-facing shoulder on the nut bears on the collar rearward-facing shoulder. The nut forward-facing shoulder and the collar rearward-facing shoulder are beveled. Thus, load from the union nut is transmitted through the collar axially to the annular boss and radially inward to the male end.

Other broad embodiments are directed to flowline components comprising a male sub which is adapted for union with a female sub of a second flowline component. The male sub comprises a male end of the component, a segmented retainer collar, and a union nut. An annular boss extends radially outward around a union face of the male end. The boss provides a rearward-facing shoulder. The segmented retainer collar is carried on the male end. It has a forward-facing shoulder and a rearward-facing shoulder. The collar forward-facing shoulder bears on the male end rearward-facing shoulder. The union nut is carried on the male end around the collar. It has internal threads adapted to engage external threads on the female sub and a forward-facing shoulder. The nut forward-facing shoulder bearing on the collar rearward-facing shoulder. The nut forward-facing shoulder and the collar rearward-facing shoulder are beveled. Thus, load from the union nut is transmitted through the collar axially to the annular boss and radially inward to the male end.

Yet other broad embodiments encompass flowline components having a male sub or a female sub which are adapted for union with, respectively, a female sub or a male sub of another flowline component. The male sub comprises a male end of the component, a segmented retainer collar, and a union nut. An annular boss extends radially outward around a union face of the male end. The boss provides a rearward-facing shoulder and a flat annular primary bearing surface. The segmented retainer collar is carried on the male end. It has a forward-facing shoulder and a rearward-facing shoulder. The collar forward-facing shoulder bears on the male end rearward-facing shoulder. The union nut is carried on the male end around the collar. It has internal threads and a forward-facing shoulder. The nut forward-facing shoulder bearing on the collar rearward-facing shoulder. The nut forward-facing shoulder and the collar rearward-facing shoulder are beveled. Thus, load from the union nut is transmitted through the collar axially to the annular boss and radially inward to the male end. The female sub comprises a female end of the component which has external threads adapted for engagement by the internal threads of the union nut. The female end also has a union face providing a flat annular primary bearing surface.

Other aspects provide for unions and flowline components where mating beveled shoulders of the union nut and segments have an angle of from about 10° to about 45° off perpendicular.

Another aspect provides unions and flowline components where the male end has an elongated annular recess adjacent to the annular boss. The annular boss extends axially rearward along the male end. The collar is carried in the recess. Similar aspects provide a recess which terminates proximate to a rear end of the collar such that the collar is substantially restricted from sliding axially within the recess.

Yet another aspect provides for unions and flowline components where the collar comprises a plurality of cylindrical retainer segments and the retainer segments are secured by a retainer ring.

Especially preferred embodiments include unions and flowline components where the annular boss of the male end provides a flat annular primary bearing surface and a union face of the female end provides a flat annular primary bearing surface. Such embodiments include embodiments where the primary bearing surface on the annular boss extends radially at least along the radial height of the collar forward-facing shoulder, as well as embodiments where primary bearing surfaces of the male and female ends extend radially across at least 50% of the radial extent of the union face of the male end.

Various aspects will utilize unions and flowline components where the female end has an elastomeric seal disposed in an annular recess in the female end and the seal recess having a substantially uniform diameter. Similar aspects include embodiments where the inner diameter of the elastomeric seal is substantially equal to the diameter of a conduit provided in the union. The subject invention also includes embodiments where the male end of the male sub has an annular boss which extends axially from the primary bearing surface and bears on the elastomeric seal.

Yet other aspects and embodiments provide unions and flowline components with a wear sleeve. Such embodiments include embodiments where the female sub has a wear sleeve disposed in a recess in the female end. They also include embodiments where the wear sleeve is composed of a metal selected from the group consisting of tungsten carbide steel alloys, borided steel, carburized steel, stainless steel, and diamond coated steel, and embodiments where the wear sleeve is disposed axially inward of an elastomeric seal.

Still other embodiments include unions and flowline components where the union nut has at least one lug projecting radially outward from the union nut which is adapted for receiving an impact from a hammer or where the union nut has no projections adapted for hammering. The latter aspects includes embodiments where the union nut has a plurality of recesses arranged circumferentially around an otherwise substantially continuous outer surface.

The subject invention also includes flow lines and fluid transportation systems which incorporate various embodiments of the novel unions and flow line components. Such embodiments include flow lines and systems used to fracture oil and gas wells.

Still other embodiments and aspects of the subject invention provide methods for assembling flow lines and fluid transportation systems. Such methods comprise providing one or more embodiments of the novel unions and flowline components and then joining mating male subs and female subs by threading the union nut onto the female sub. Such novel methods include, but are not limited providing a first flowline component having a male sub, providing a second flowline component having a female sub, and joining the first and second flowline components. The male sub comprises a male end of the first component, a segmented retainer collar, and a union nut. An annular boss extends radially outward around a union face of the male end. The boss provides a rearward-facing shoulder. The segmented retainer collar is carried on the male end. It has a forward-facing shoulder and a rearward-facing shoulder. The collar forward-facing shoulder bears on the male end rearward-facing shoulder. The union nut is carried on the male end around the collar. It has internal threads and a forward-facing shoulder. The forward-facing shoulder bears on the collar rearward-facing shoulder. The nut forward-facing shoulder and the collar rearward-facing shoulder are beveled. Thus, load from the union nut is transmitted through the collar axially to the annular boss and radially inward to the male end. The female comprises a female end of the second component which has external threads adapted for engagement by the internal threads of the union nut. The first and second flowline components are joined by threading the union nut of the male sub of the first component onto the female end of the female sub of the second component.

Various other aspects and embodiments of the subject invention are directed to union nuts for unions and flowline components which have a male sub adapted for union with a female sub. The union nut is adapted for assembly into the male sub. It comprises an annular body having internal threads at one end thereof. The threads are adapted to engage external threads on the female sub. The nut also has an annular boss extending radially inward from the other end thereof. The annular boss is adapted to transfer load from the union nut to other components of the male sub. A plurality of recesses are arranged circumferentially around an otherwise substantially continuous outer surface of the union nut.

Related embodiments are directed to wrenches adapted to engage such embodiments of the novel union nuts. The wrench comprises a head and a handle. The head is a broken annular head which is adapted to extend partially around the outer surface of the union nut. The head also has a plurality of projections extending from an inner surface of the head. The projections are adapted to engage the recesses of the union nut. The handle extends the head and is adapted to allow the application of torque to the head when the head is seated on the union nut. Preferred embodiments of the novel wrenches have a gauge boss extending around the inner surface of the head.

Finally, still other aspect and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

Figure 1:
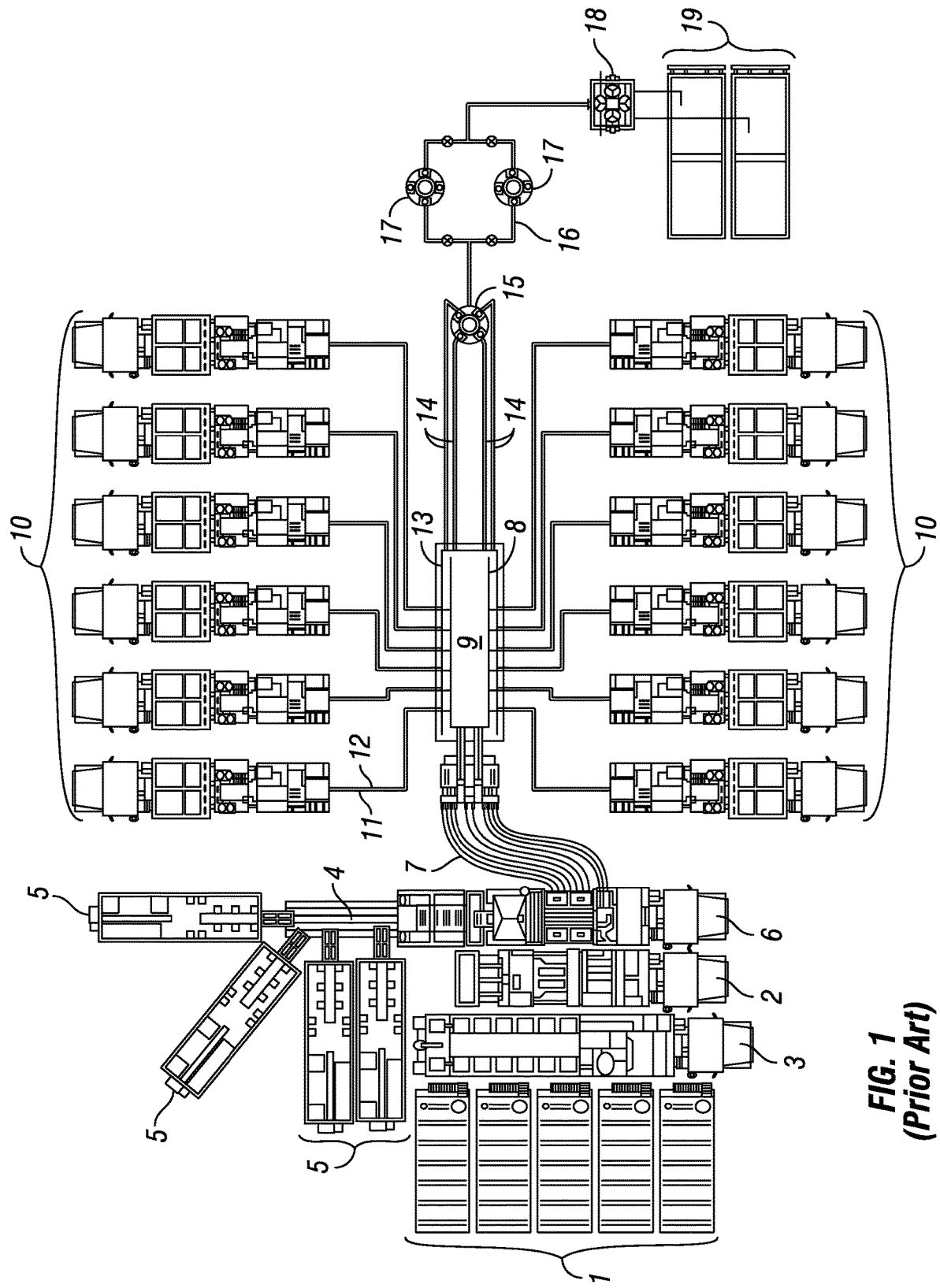
FIG. 1 (prior art) is a schematic view of a system for fracturing a well and receiving flowback from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to unions for flowline components, and especially for high-pressure flow unions. Various specific embodiments will be described below. For the sake of conciseness, all features of an actual implementation may not be described or illustrated. In developing any actual implementation, as in any engineering or design project, numerous implementation-specific decisions must be made to achieve a developers' specific goals. Decisions usually, will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

The novel unions typically will be used to connect components of temporary pipe and flow line installations. They are particularly useful for temporary installations that must be assembled and disassembled on site. Such flow lines are common in chemical and other industrial plants, on marine dredging vessels, strip mines, and especially in the oil and gas industry. Frac systems, such as those shown in FIG. 1, are a very common application where unions are a practical necessity.

High-pressure flow lines, such as flow lines 14 which run from frac manifold 9 to goat head 15 and deliver slurry into a well, are made up of heavy steel components. The components include sections of straight steel pipe, referred to as pup joints. Various fittings, such as elbows, tees, crosses, laterals, wyes, swivel joints, and adaptors, are incorporated into the line to combine or split flow or to alter the course of the line. High-pressure flow lines also incorporate gauges and other monitoring equipment, as well as control devices such as shut off, plug, check, throttle, pressure release, butterfly, and choke valves.

The novel unions are particularly suited for use in assembling such components. They also may be used to assemble or connect other pumping and flowback equipment, especially on the high-pressure side of a frac system or well. Such equipment might include manifolds, such as frac manifold 9 shown in FIG. 1, pumps 10, goat head 15, zipper manifold 16, trash collectors, and sand separators. The union subs may be fabricated as separate components and then threaded or welded to the rest of a flowline components. For example, the subs may be fabricated from different metal from the rest of the component, such as harder, more corrosion resistant alloys, and then friction welded (solid state forged) to the rest of the component. More commonly, however, the subs are forged or otherwise formed integrally with the components and equipment. In either event, components will be provided with various combinations of male and female subs which allow them to be assembled together as desired.

Figure 3:
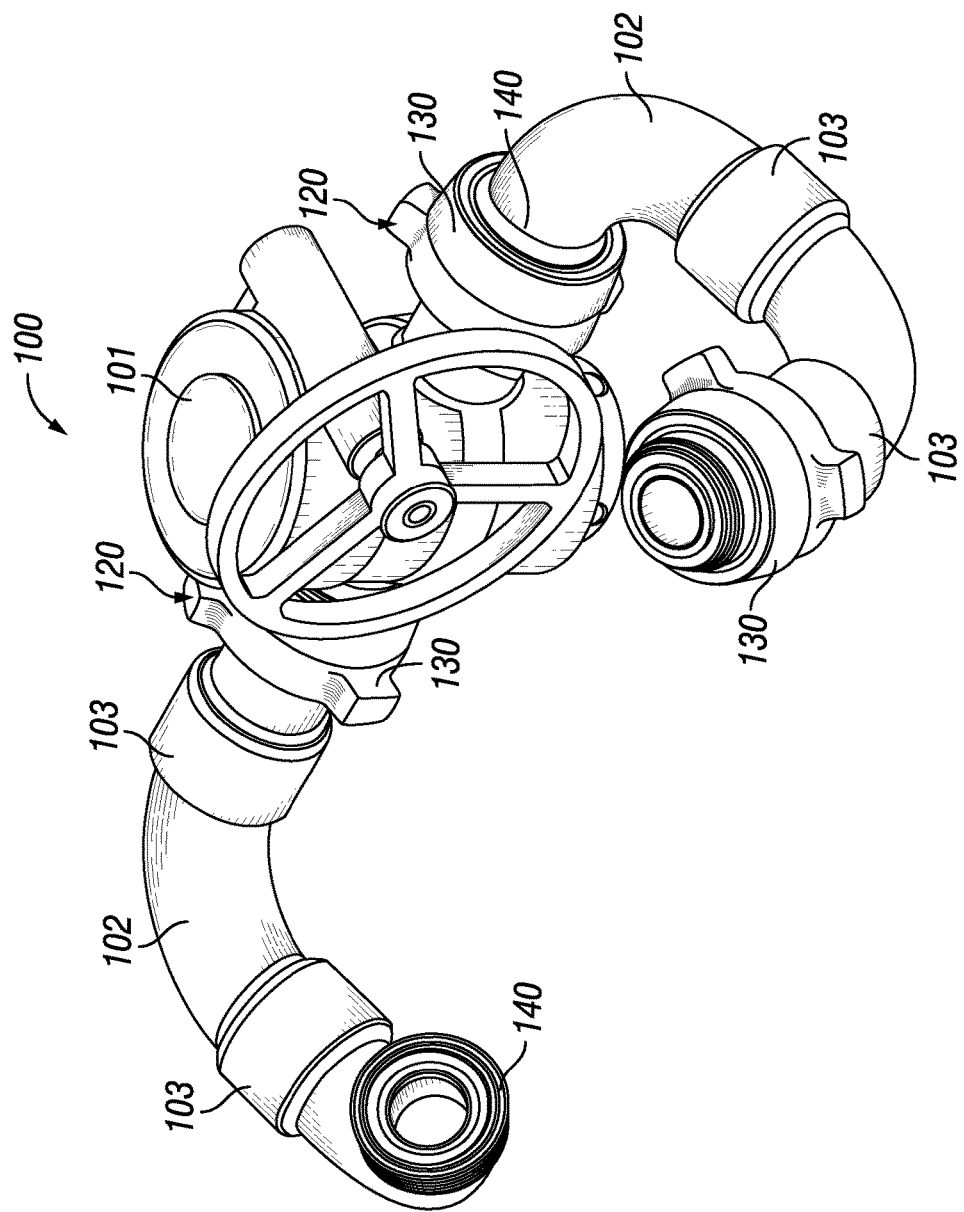
FIG. 3 is an isometric view of a high-pressure flowline subassembly 100 incorporating a first preferred embodiment 120 of the flowline unions of the subject invention, which subassembly 100 may be incorporated, for example, into high-pressure flow lines 12 and 14 of the frac system shown in FIG. 1.

For example, FIG. 3 illustrates a subassembly 100 which may be incorporated into a high-pressure flow line of a frac system, such as high-pressure flow lines 14 of the frac system shown in FIG. 1. High-pressure subassembly 100 comprises a plug valve 101 and a pair of swivel joints 102. Swivel joints 102 comprise joints 103 which are packed with bearings which allow sections of joints 102 to swivel or rotate relative to each other. Plug valve 101 and swivel joints 102 are connected by a first preferred embodiment 120 of the unions of the subject invention.

As will be better appreciated from the discussion that follows, plug valve 101 has a male sub 130 on one side and a female sub 140 (not visible) on the other side. Similarly, swivel joints 102 have a male sub 130 and a female sub 140 on opposite ends. Plug valve 101 and swivel joints 102 have been assembled by bringing their respective male 130 and female subs 140 together and tightening a union nut 160. One swivel joint 102 has an open male sub 130, and the other has an open female sub 140. Subassembly 100, therefore, may be assembled into a flow line in a similar fashion.

Some broader embodiments of the novel unions have a male sub with an annular boss on a male end of a component, a plurality of cylindrical retainer segments disposed around the male end, a female sub with external threads on a female end of another component, and a union nut carried around the retainer segments on the male end. The union nut and segments are provided with mating beveled shoulders such that load from the union nut is transmitted both radially inward to support the walls of the male end and axially forward to allow the male end to bear on the female end. Other broad embodiments include other features designed to strengthen and support the male end and to better distribute stress through the union.

Figure 4:
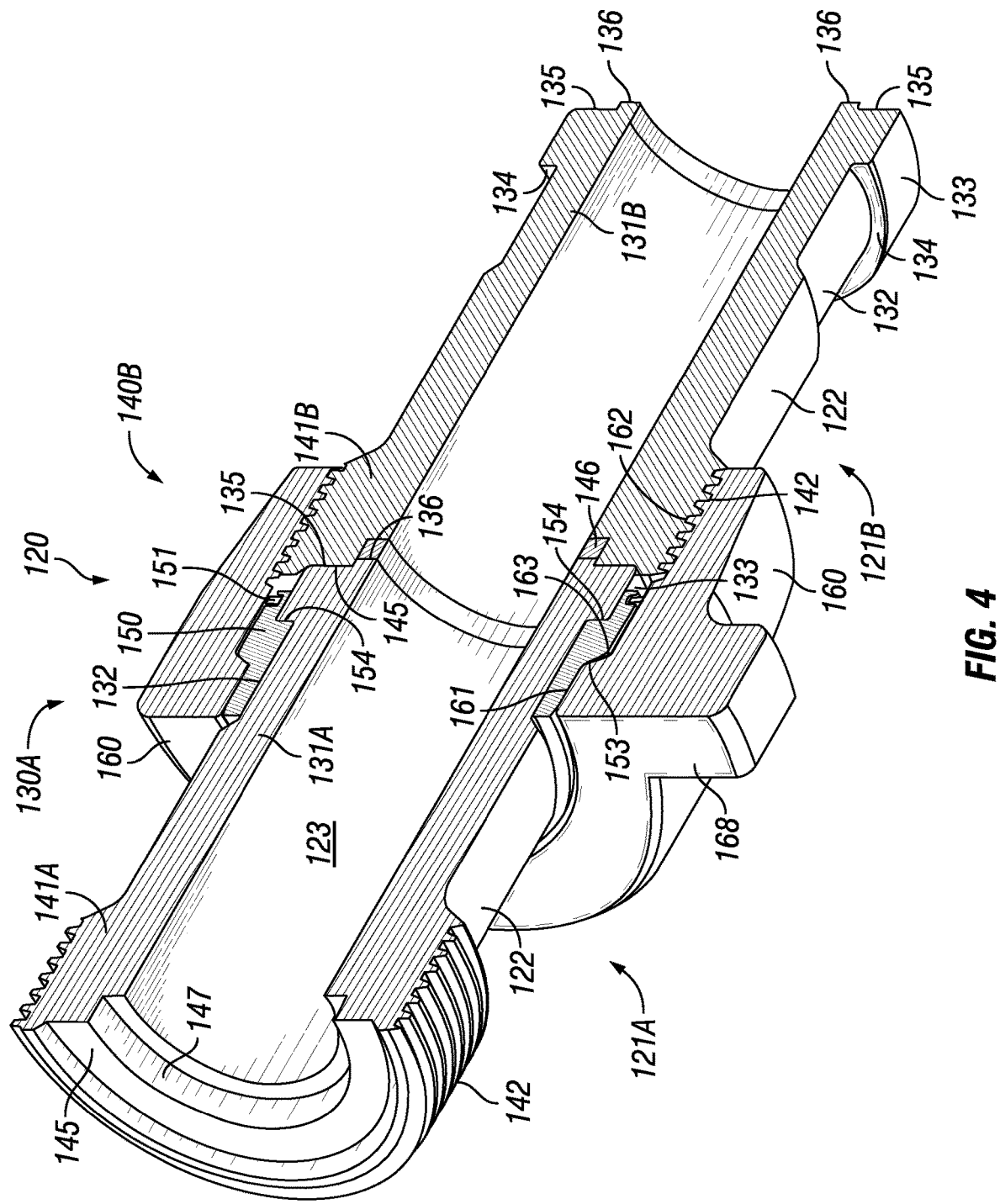
FIG. 4 is an isometric cross-sectional view of novel union 120 shown generally in FIG. 3.
Figure 5A:
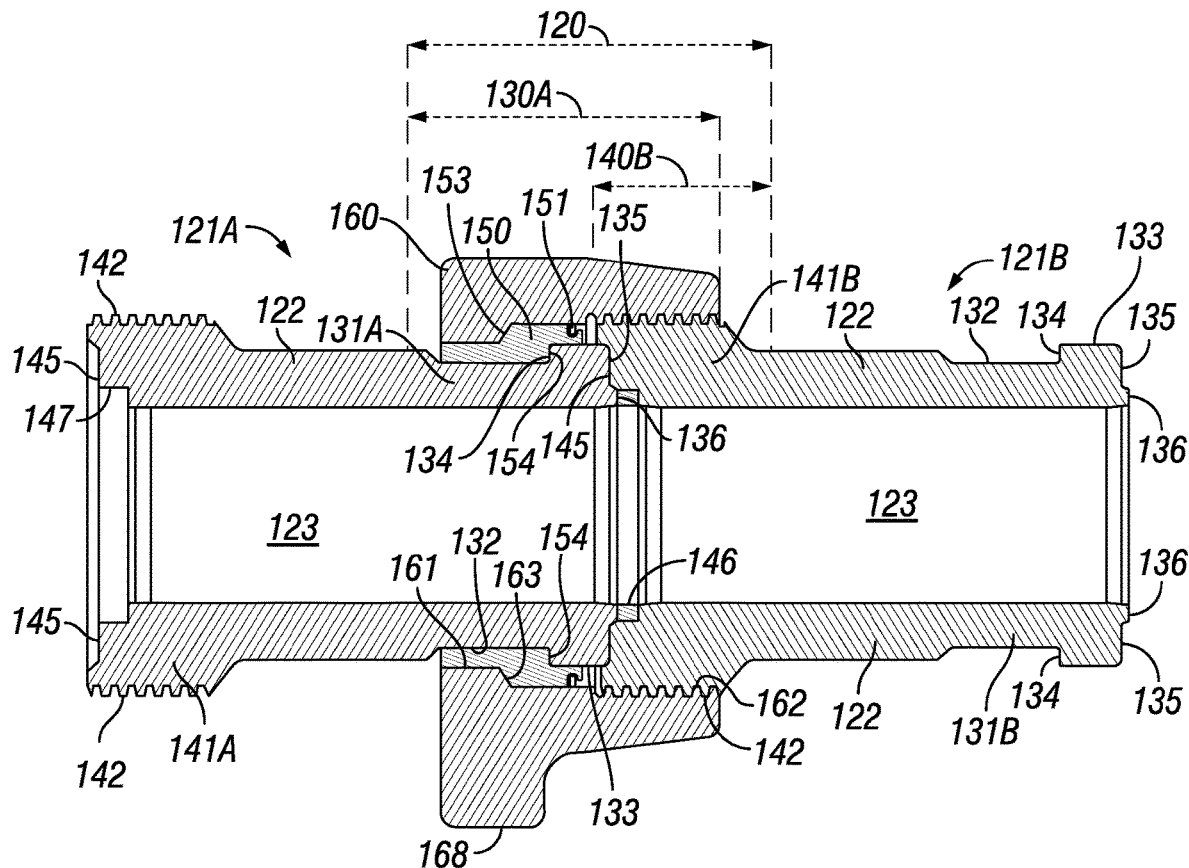
FIG. 5A is a cross-sectional view of union 120 shown in FIG. 4.
Figure 5B:
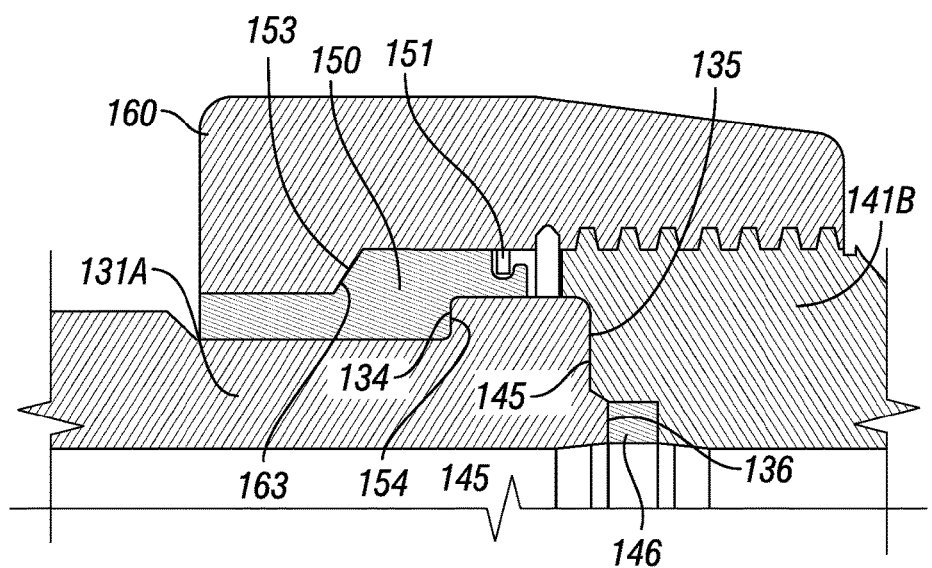
FIG. 5B is an enlargement of a portion of union 120 shown in FIG. 5A.

For example, and referring to FIGS. 4-5, union 120 may be used to connect two pup joints 121a and 121b and generally comprises a male sub 130 and a female sub 140. Pup joints 121 are identical, although certain components of male subs 130 and female subs 140 have been omitted from the figures for purposes of exposition. It also will be appreciated that as illustrated, pup joints 121 appear relatively short. Pup joints 121 may be of any length, but typically will be quite long, much longer than they appear in the figures.

Pup joints 121 have an elongated body 122 defining a central bore 123 through which fluids may flow. Male sub 130 is at a male end portion 131 of body 122, and female sub 140 is at a female end portion 141 of body 122. Male end portions 131 and female end portions 141 are formed integrally with body 122 of pup joints 121. That will be typical, but as noted, they may be fabricated as separate parts and then joined to straight pipe, e.g., by threads or welding. Regardless, male end 131 and female end 141 may be viewed conceptually as a component of union 120 and, more particularly, as components of, respectively, male sub 130 and female sub 140. They may be viewed as a base, or as mandrels or bodies which incorporate or carry other features and components of union 120 and of male sub 130 and female sub 140.

Male sub 130 generally comprises, is addition to male end 131, a plurality of retainer segments 150 and a union nut 160. Retainer segments 150 are arranged circumferentially around male end 131. Preferably, as shown, they are carried in an external groove 132 in the male end 131. Union nut 160 is carried on and around retainer segments 150.

The configuration of retainer segments 150 is best appreciated from FIGS. 4-5, but they may be described in general terms as lateral segments of an open, radially profiled cylinder or, more simply as "cylindrical" segments. Each segment 150 is somewhat elongated and is radially profiled along its length to provide a rearward-facing shoulder 153 and a forward-facing shoulder 154. Segments 150 are arranged side-by-side around groove 132 and are secured with snap ring 151. Snap ring 151 fits into corresponding grooves provided in a reduced diameter portion at the forward end of segments 150. Thus, segments 150 may be viewed collectively as a segmented collar extending around groove 132 and having rearward-facing shoulder 153 and forward-facing shoulder 154. As described in detail below, rearward-facing shoulder 153 will engage union nut 160 and forward-facing shoulder 154 will engage male end 131.

It will be appreciated that the terms "forward," "rearward," "front," "back," and the like reference axial location or orientation relative to the mating ends of male sub 130 and female sub 140. For example, shoulder 153 is a "rearward-facing" shoulder because it is facing away from the mating end of male sub 130. Shoulder 154 is a "forward-facing" shoulder because it is facing toward the mating end of male sub 130. "Axial," "radial," and forms thereof reference the central axis of the unions. "Inner," "outer," "internal," "external," "inside," "outside," and the like reference radial location or orientation relative to the central axis of the unions. For example, groove 132 is an "external" groove because it is on the lateral surfaces of male end 131 which are further away radially from the central axis.

Union nut 160 has a generally annular body. The front end of union nut 160 is provided with internal threads 162. Threads 162 typically are relatively coarse trapezoidal threads, such as ACME threads. The rear end of union nut 160 has an annular boss 161 extending radially inward, thus providing a forward-facing shoulder 163. Forward-facing shoulder 163, as described in detail below, will engage retainer segments 150.

Male end 131 has an annular boss 133 extending radially outward at its union face, i.e., the forward-facing surfaces on male end 131 which abut or otherwise extend adjacent to and mate with the forward-facing surfaces on female end 141. Preferably, as shown in FIGS. 4-5, boss 133 is defined largely by annular groove 132 in male end 131. Boss 133 provides an annular, reward-facing shoulder 134 and an annular, forward-facing primary bearing surface 135. A relatively short annular boss extends axially from the inner periphery of primary bearing surface 135. Annular boss thus provides an annular, forward-facing secondary bearing surface 136. As described in detail below, rearward-facing shoulder 134 will engage segments 150, and primary 135 and secondary bearing surfaces 136 of male sub 130a will engage female end 141b of female sub 140b.

Female end 141 of female subs 140 is generally enlarged radially. External threads 142 are provided on the enlarged female end 141. Since they will engage threads 162 on union nut 160, threads 142 on female part 141 typically will be relatively coarse trapezoidal threads, such as ACME threads. The union face of female end 141 also provides a primary bearing surface 145 which, as described in detail below, will mate with primary bearing surface 135 of male sub 130a.

Preferably, union face of female end 141 is provided with features which ensure proper alignment between female end 141 and male end 131. For example, as may be seen in FIGS. 4-5, the union face of female end 141 has a shallow beveled countersink, thus providing it with a small tapered region extending on, and a short skirt extending from the outer periphery of primacy bearing surface 145. The union face of male end 131, therefore, will be guided into engagement with female 141 end, and primary bearing surfaces 135 and 145 will be properly aligned.

Female subs 140 also are provided with an annular seal 146 which is carried in a groove 147. Groove 147 extends around the inner periphery of primary bearing surface 145 of female end 141. Seal 146 may be fabricated from elastomers, such as nitrile butadiene rubber (NBR), hydrogenated nitrile butadiene nitrile rubber (HNBR), and fluoroelastomers such as Viton®, or polytetrafluoroethylene, and it may incorporate metal rings, such as brass or stainless steel, which help to control extrusion of seal 146. Seal 146 typically will be sized such that it extends slightly beyond primary bearing surface 145 on female end 141. Groove 147 can be provided with a smaller, narrow groove such that seal 146 may be provided with a radially projecting annular lip. Such seal lip grooves, however, can further weaken the relatively thin areas at the bottom of threads 142 on female end 141. Thus, the outer diameter of seal 146 preferably is sized such that it may be fitted into groove 147 under radial compression and remain therein. As described further below, seal 146 will mate with secondary bearing surface 136 in male sub 130a.

It will be appreciated that retainer segments 150, among other purposes, serve to retain union nut 160 on pup joint 121 and to transfer load from union nut 160 to male end 131 of male sub 130. That is, unless the back end of a component is such that it allows the union nut to pass over it, the union nut must be able to pass over the front end. If it can pass over the front end of the component, not only might it slip off the component, but it also will be incapable of bearing on and applying force to the component.

Union nut 160, for example, cannot pass over female end 141 of pup joint 121. The inner diameter of annular boss 161, however, is sized such that union nut 160 can pass over male end 131. Thus, male sub 130 may be assembled by passing union nut 160 over boss 133 on male end 131, sliding it rearward past groove 132, and then assembling segments 150 around groove 132. Once segments 150 are installed union nut 160 may be slid forward. The inner diameter of front end of union nut 160 is enlarged relative to the inner diameter of annular boss 161. Thus, union nut 160 can extend over segments 150 and beyond male end 131. Interference between boss 161 on union nut 160 and segments 150, however, will prevent union nut 160 from passing over segments 150 and off male end 131.

More importantly, however, the assembled segments allow compressive forces to be transmitted from union nut 160 through segments 150 to male end 131. That is, pup joints 121 may be connected by threading union nut 160 of pup joint 121a onto female sub 140b of pup joint 121b. Inner threads 162 on union nut 160 will engage outer threads 142 on female end 141b. Once male sub 130a initially contacts female sub 140b, further tightening of union nut 160 will generate axial compressive forces between male sub 130a and female sub 140b.

More specifically, as union nut 160 is tightened, forward-facing shoulder 163 on union nut 160 bears on rearward-facing shoulder 153 on segments 150. Forward-facing shoulder 154 of segments 150 bears on rearward-facing shoulder 134 of male end 131a. Thus, primary bearing surface 135 on male end 131a will bear on primary bearing surface 145 of female end 141b. At the same time, secondary bearing surface 136 on male end 131a will bear on and compress seal 146 in female end 141b.

The novel unions provide various advantages over prior art unions. First, it will be appreciated that fluid pressure bears equally on all walls of a container. The walls of a hydraulically pressured cylindrical container, for example, will experience equal radial load angularly about and along the entire length of the central axis. Thus, there is a high degree of axial symmetry in unions and other flowline connections, especially those intended for high-pressure flow lines. Any reduction in the nominal diameter of a component, such as pup joints 21, will create a weak spot which to a great degree cannot be mitigated by making other areas thicker. For example, annular groove 32 on the outer surface of male end 31 of pup joints 21 extends axially for some distance and creates an extensive weak area in male body 22.

In various embodiments of the novel unions, such as novel union 120, forward-facing shoulder 163 on union nut 160 and rearward-facing shoulder 153 on segments 150 have mating bevels. When union nut 160 is tightened and bears on segments 150, beveled shoulders 163 and 153 will distribute the load both axially forward and radially inward through segments 150. Segments 150, therefore, are not only able to bear axially on male end 131 to support joining of male sub 130 and female sub 140, but they also will bear radially inward on male end 131 and provide support for the weakened area along annular groove 132. The bevels on shoulders 163 and 153 are approximately 30° off perpendicular, and thus distribute a significant portion of the load from union nut 160 radially inward. In accordance, therewith, shoulders 163 and 153 preferably are provided with bevels of from about 10° to about 45° off perpendicular.

Figure 2A:
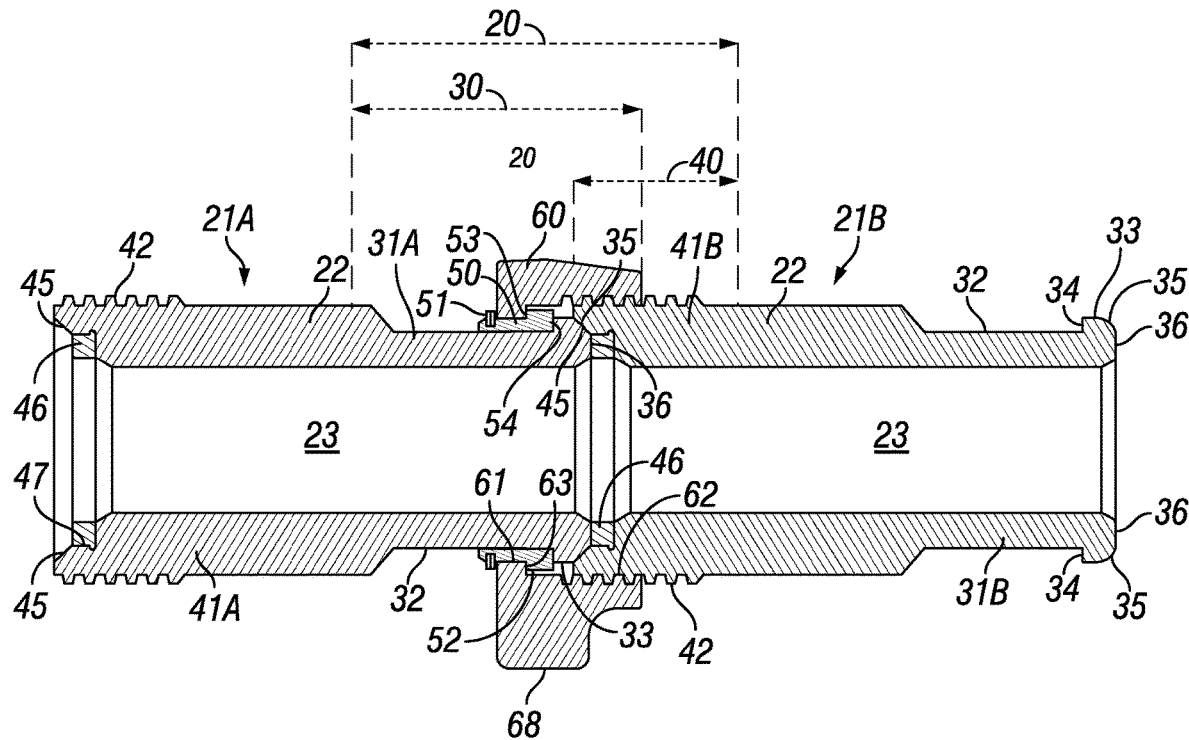
FIG. 2A (prior art) is a cross-sectional view of a prior art high-pressure flowline union 20 connecting two pup joints 21.
Figure 2B:
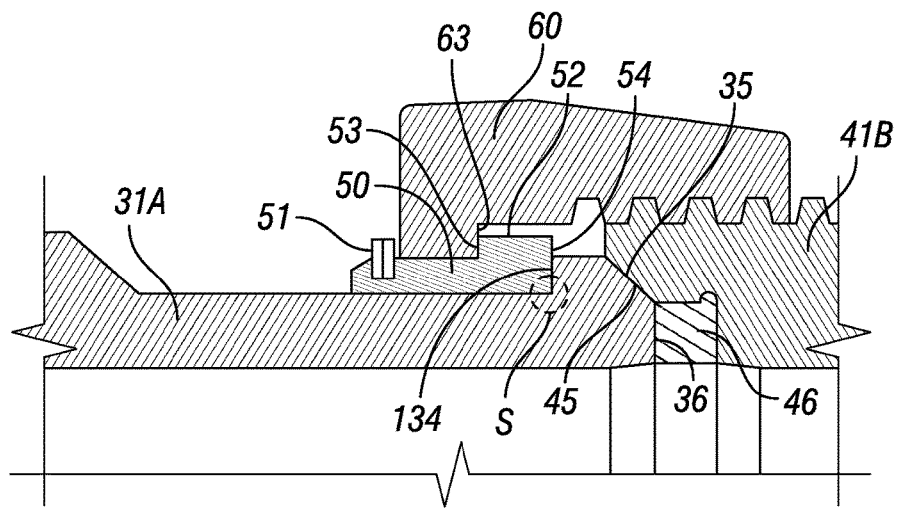
FIG. 2B is an enlargement of a portion of union 20 shown in FIG. 2A.

In contrast, load from prior art union nut 1502 Weco union 20 shown in FIG. 2 will not support the weakened area along annular groove 32 in male end 31. A forward-facing shoulder 63 is provided by an annular boss 61 extending radially inward from the rear end of union nut 60. Boss 52 on segments 50 provide a rearward-facing shoulder 53 on segments 50. Both shoulder 63 and shoulder 53, however, are essentially flat. That is, they extend substantially perpendicular to the central axis of union 20. Thus, when forward-facing shoulder 63 of union nut 60 bears on rearward-facing shoulder 53 of segments 50, the entire load will be transmitted axially through segments 50 to male end 31. No portion of the load will be transmitted radially inward through segments 50, and segments 50 provide no support for the weakened area along annular groove 32.

It also will be appreciated that in novel union 120, segments 150 are not required to slide back and forth across male end 131. Thus, they fit closely within annular recess 132. Annular recess 132 in male end 131 terminates proximate to, and does not extend axially substantially beyond the rear end of segments 150. Preferably, the extent of recess 132 is no more than is required to load segments 150 therein, and retainer segments 150 will be substantially restricted from sliding axially within recess 132. Minimizing the axial extent of recess 132 correspondingly minimizes the extent of the weakened area under recess 132. Moreover, because they do not have to slide, the inner diameter of segments 150 closely approximates the outer diameter of recess 132, and segments 150 closely fit recess 132. Thus, radial load transmitted through segments 150 by union nut 160 will be distributed more evenly to recess 132, providing more uniform support.

In the prior art Weco union 20, however, segments 50 are required to slide back and forth along male end 31, carrying union nut 60 with them. Thus, the inner diameter of segments 50 is oversized relative to the outer diameter of recess 32, and segments 50 form a loose-fitting collar. Even if union nut 60 and segments 50 were otherwise configured to generate load radially inward, much of that load would be absorbed by compressive strain within segments 50 and not brought to bear on recess 32. Annular recess 32 in male end 31 also is relatively extensive and extends axially well beyond the rear end of segments 50 to allow room for segments 50 to slide rearward. Annular recess 32, therefore, creates a relatively extensive area of weakness in male end 31 which is not supported in any fashion by segments 50.

It also will be appreciated that hammer unions, especially those in high-pressure flow lines, require very high loads across the primary bearing surfaces to ensure a reliable connection between components. The load is generated by the threaded engagement between the union nut and the female end. It must be transmitted and distributed through the nut, the segments, and the male and female ends without creating excessive stress in any particular area.

The prior art Weco union 20, for example, has relatively small, critical areas where load is focused, and the resulting stress potentially can cause cracking or failure of the union. That is, primary bearing surface 45 in female end 41 is configured to guide primary bearing surface 35 in male end 31 into proper contact. As will be appreciated from FIG. 2, that function appears to be served by mating bevels. That is, primary bearing surface 35 in male end 31 and primary bearing surface 45 in female end 41 appear to have mating tapered surfaces.

Primary bearing surface 35 in male end 31, however, in fact is a curved, convex surface, having the shape of a chordally truncated torus. The curve is slight, and it will be appreciated that bearing surface 35 on pup joint 21*b* has been exaggerated for the sake of exposition. Primary bearing surface 44 on female end 42, however, is tapered as shown. Thus, while still facilitating proper alignment thereof, there is "point" contact, between primary bearing surfaces 34 and 44. That is, they contact each other tangentially and define for practical purposes a circular contact line. Even allowing for compression of primary bearing surface 34 on male end 31 as union nut 60 is tightened, load will be distributed through a very thin, annular contact surface. That creates an area S, denoted generally in FIG. 2B, of high bending and shear stress at the base of a rearward-facing shoulder 34 provided by annular boss 33 at the union face of male end 31. Moreover, because primary bearing surface 34 of male end 31 extends generally rearward and outward, there is less material through which load may be distributed through boss 33.

The "point" contact between primary bearing surface 34 on male end 31 and primary bearing surface 44 on female end 41 also exacerbates stress experienced by boss 33 and other components of union 20 in other ways. That is, as fluid is pumped through a conduit, especially under high pressures such as those required for fracturing, the conduit will experience vibrational forces. Those forces are created in large part by the cycling of the pumps and differences in flow patterns in the line. They will vary in frequency, but they can generate considerable torque across the unions. The point contact between primary bearing surfaces 34 and 44 in prior art connector 20 is relatively inefficient in distributing those forces through union 20 and minimizing cyclic stress fatigue in union 20 and especially in male end 31.

Embodiments of the novel unions, however, are significantly better at distributing such stress. In union 120, for example, the union face of female end 141 is only provided with a small tapered region extending around the outer periphery of primary bearing surface 145. The small tapered region will guide the union face of male end 131 into engagement with the female sub, but primary bearing surface 135 in male end 131 and primary bearing surface 145 in female end 141 are both substantially flat. They also extend across the substantial majority of the union faces of male end 131 and female end 141. For example, as shown in FIG. 5, bearing surfaces 131 and 141 extend radially approximately 70% of the radial thickness of boss 133 in male end 131. Preferably, they will extend at least about 50% of the radial extent of the union face of the male end, e.g., the radial thickness of boss 133 on male end 131 of union 120. It also will be noted that primary bearing surface 135 on male end 131 extends radially outward along the full height of boss 133 and rearward-facing shoulder 134, thus providing boss 133 with a substantially uniform axial thickness.

Primary bearing surfaces 135 and 145 in union 120, by providing a relatively extensive, flat contact area, also are better able to distribute stress through male end 131 and female end 141, especially torque stress. Thus, they will enhance the resistance of male end 131 to cyclic stress fatigue. Moreover, providing flat bearing surfaces 135 on male end 131 allows boss 133 and, in particular, the area between bearing surface 135 and rearward-facing shoulder 134 to be thickened without increasing the overall length of male end 131. Rearward-facing shoulder 134, therefore, is uniformly and more heavily supported across its full radial extent. More importantly, shear stress at the base of rearward-facing shoulder 134 will be significantly diminished.

In addition, union nut 60 is provided with lugs 68 which extend around and radially outward from the rear of union nut 60. Union 20, as noted previously, will be made up and broken down by using a hammer to strike lugs 68. As union nut 68 is tightened, however, the "point" contact on primary bearing surface 34 of male end 31 will tend to flatten incrementally. Such flattening may make it difficult to determine exactly when union nut 60 has been sufficiently tightened. Hammers are blunt force instruments, rarely commended for fine and reproducible blows, but well known for the enthusiasm with which they are wielded. Thus, there is a significant risk that union 60 will be overtightened and add additional stress throughout union 20 and especially through boss 33 of male end 30.

In contrast, the flat, mating primary bearing surfaces 134 and 144 in, respectively, male end 131 and female end 141 of novel union 120 allow workers to readily determine when union nut 160 is sufficiently tightened. Once male sub 130 and female sub 140 are brought together and union nut 160 has been tightened to the point where primary bearing surfaces 134 and 144 engage, the load across bearing surfaces 134 and 144 which must be overcome to further tighten union nut 160 will increase dramatically. The dramatic increase in resistance felt as a hammer strikes lugs 168 will provide a clear indication that union 120 has been made up.

Embodiments of the novel invention also may provide better wear resistance through the union. As noted above, flow through unions may be quite turbulent, and given the abrasive and corrosive nature of conveyed liquids, they are particularly susceptible to wear. Male ends 131 and female ends 141 of union 120, however, provide a relatively uniform diameter for bore 123. In contrast to the recessed elastomeric seal 46 and highly beveled openings in male end 31 and female end 41 of prior art Weco union 20, seal 146 has an inner diameter substantially equal to the diameter of bore 123. The openings in bore 123 are minimally beveled. Moreover, seal 146 and seal groove 147 have been moved radially inward, thus allowing further enlargement of primary bearing surfaces 134 and 144. Bore 123 of union 120, therefore, will create less turbulence and experience less wear in male end 131 and female end 141.

In general, the various components of the novel unions may be fabricated by methods and from materials commonly used in manufacturing flow iron components. Given the extreme stress and the corrosive and abrasive fluids to which flowline components are exposed, especially those designed for high-pressure flow lines, suitable materials will be hard and strong. For example, excepting their seals, the components of novel unions may be fabricated from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part.

Figure 6:
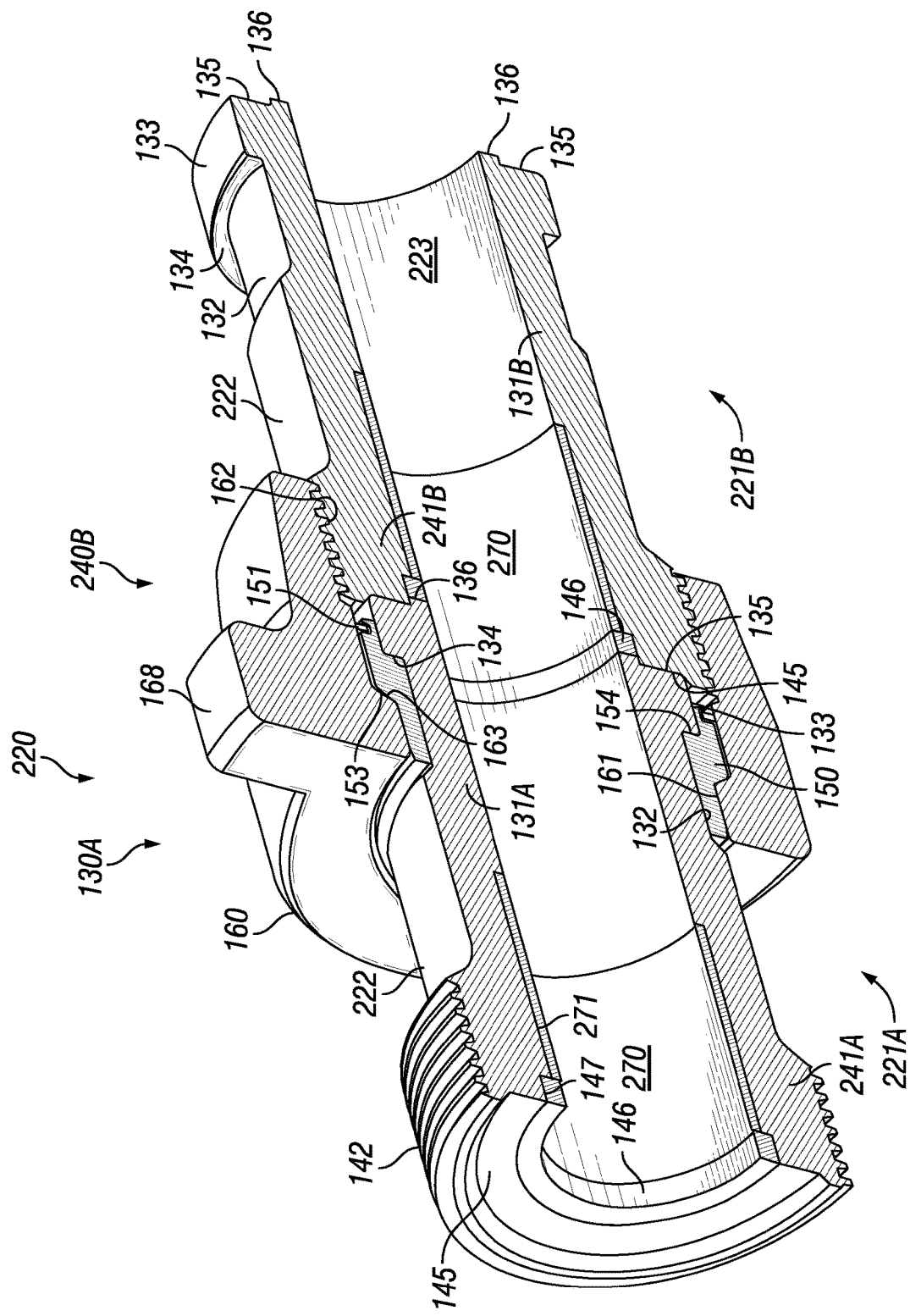
FIG. 6 is a cross-sectional isometric view of a second preferred embodiment 220 of the high-pressure flowline unions of the subject invention, which union 220 incorporates a wear sleeve 270.
Figure 7:
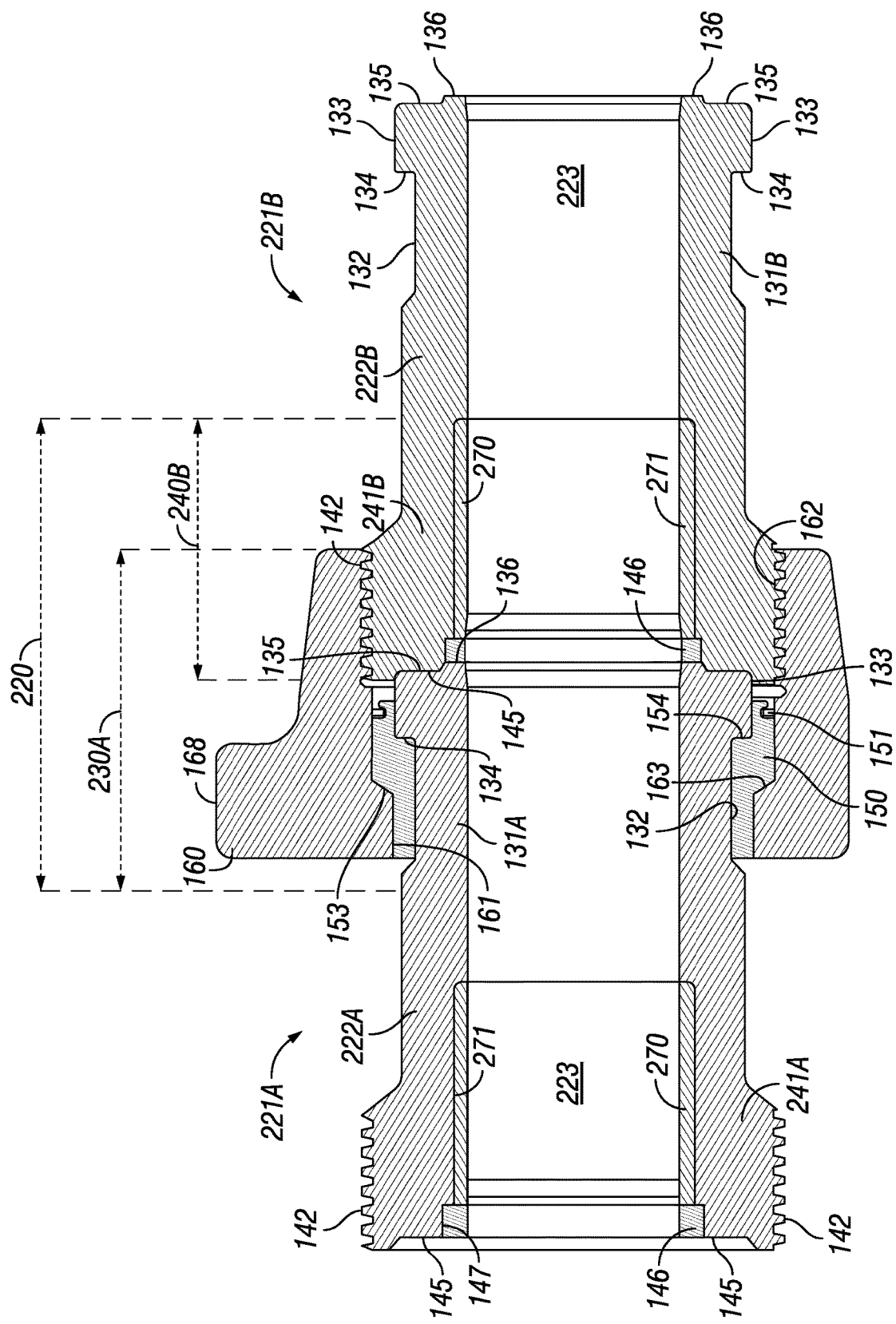
FIG. 7 is a cross-sectional view of union 220 shown in FIG. 6.

A second preferred embodiment 220 of the unions of the subject invention is shown in FIGS. 6-7. As shown therein, union 220 is substantially identical to union 120 except that it incorporates a wear sleeve 270. Union 220 generally comprises a male sub 130 and a female sub 240. Male sub 130 generally comprises male end 131, retainer segments 150, and union nut 160. Female sub 240 generally comprises a female end 241, seal 146, and wear sleeve 270.

Wear sleeve 270, as its name implies and as may be seen in FIGS. 6-7, has an open cylindrical shape. Wear sleeve 270 is carried in an annular recess 271 in female end 241 of union 220. Annular recess 271 extends axially rearward from the union face of female end 241. Thus, wear sleeve 270 defines in part a bore 223 extending through pup joints 221.

Wear sleeve 270 is fabricated from more wear resistant materials than those used elsewhere in union 220. For example, wear sleeve 270 may be fabricated from tungsten carbide steel alloys, borided steel, carburized steel, stainless steel, or diamond coated steel. Preferably, wear sleeve 270 is sized such that it will fit tightly within recess 271 and be held securely within female end 241. Seals, such as elastomeric O-rings, also may be provided between wear sleeve 270 and recess 271 if desired.

Turbulence through unions will exacerbate erosion and corrosion, and so sleeve 270 may extend through the major areas of bore 223 of union 220 where turbulent flow occurs. Its precise length in female end 241 may be varied. Similarly, male end 131 also may be provided with a wear sleeve at its union face. Novel union 220, therefore, will be more resistant to erosion and wear. It also will be appreciated that wear sleeve 270 may be replaced after a period of service, thus avoiding the necessity of scraping an entire part.

Figure 8:
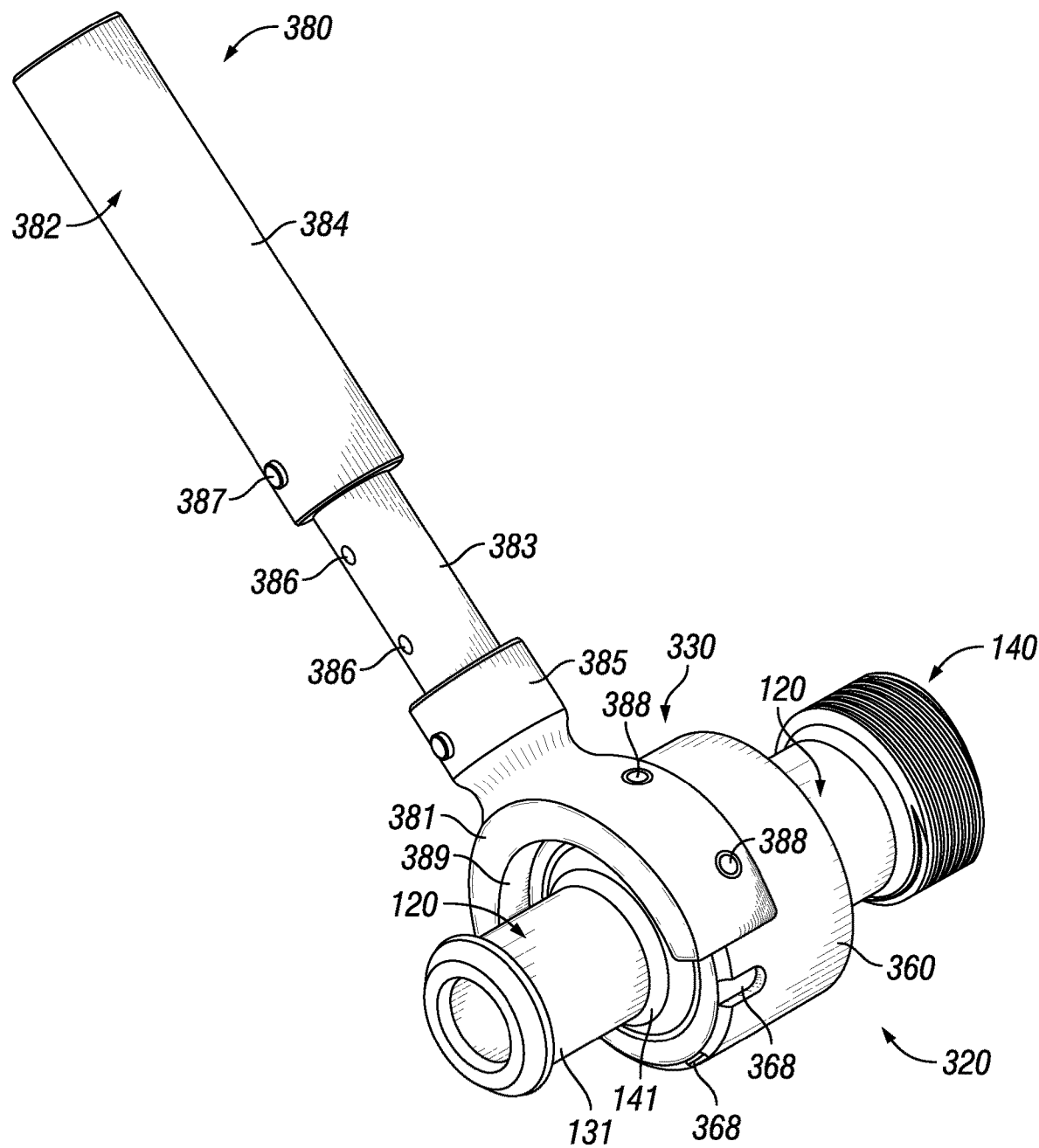
FIG. 8 is an isometric view of a third preferred embodiment 320 of the novel unions, which union 320 incorporates a preferred embodiment 360 of the union nuts of the subject invention. Union nut 360 is being rotated by a preferred embodiment 380 of the wrenches of the subject invention.

A third preferred embodiment 320 of the unions of the subject invention is shown in FIG. 8, which depicts union 320 being made up with a preferred embodiment 380 of the wrenches of the subject invention. It will be appreciated that union 320 is substantially identical to union 120 except that it incorporates a preferred embodiment 360 of the union nuts of the subject invention.

It will be appreciated that in almost all respects, union nut 360 is identical to union nut 160 in union 120. Unlike union nut 160, however, novel union nut 360 is not provided with any lugs. The outer surface of union nut 360 is generally smooth, forming an almost continuous cylindrical surface as may be seen in FIG. 8. In any event, the outer surface of union nut 360 will lack any radial projections which may be struck by hammers used to make up and break down conventional hammer unions.

Instead, union nut 360 is provided with recesses, such as slots 368, which are arranged circumferentially around its forward end. Slots 368 are open at their forward end and extend axially rearward a short distance. As described further below, slots 368 allow wrench 380 to engage union nut 360 for tightening and loosening.

Figure 9:
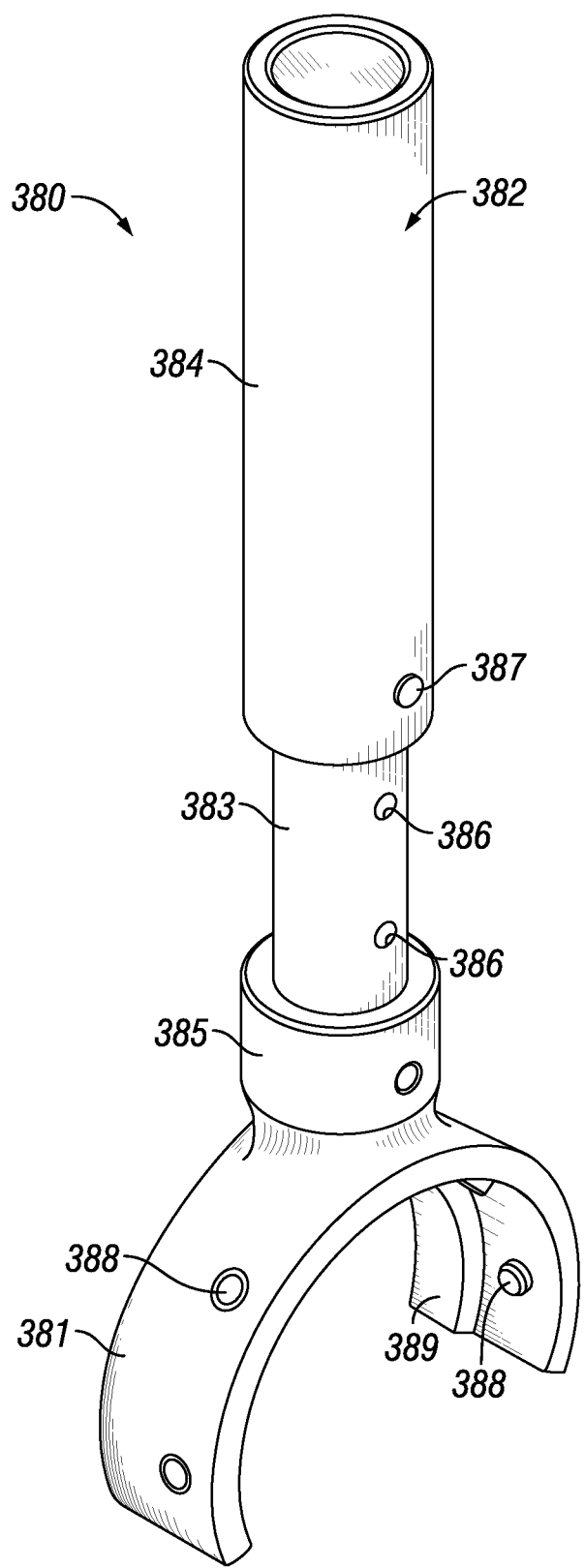
FIG. 9 is an isometric view of wrench 380 shown in FIG. 8.

As best appreciated from FIG. 9, wrench 380 generally comprises a head 381 and a handle 382. Head 381 may be described as having a C-shape or that of a broken annulus or ring. The break in head 381 preferably is sized such that head 381 may pass over the body of a flowline component, such as pup joints 121, but yet will extend as far around the circumference of union nut 360 as possible.

The inner surface of head 381 defines a radially truncated, radially profiled, open cylinder. A number of pins 388 are arranged circumferentially around, and project radially inward from the inner surface of head 381. Pins 388 are generally cylindrical and are sized such that they may be accommodated in slots 368 of union nut 360. It will be appreciated of course that slots 368 in nut 360 and pins 388 of wrench 380 may be provided with other mating geometries, and the novel wrenches are not limited to the geometries illustrated in the preferred embodiments.

The inner radius of head 381 in general is slightly larger than the external radius of union nut 360. Head 381, however, is provided with a broken annular gauge boss 389 extending radially inward from the inner surface of head 381 above pins 388. Head 381, when pins 388 are aligned with slots 368, thus may be inserted over the end of union nut 360. Gauge boss 389 ensures that head 381 is properly seated around union nut 360.

Head 381 of wrench 380 preferably is provided with a hub 385 extending radially outward from its outer surface. A handle may be integrally formed with or otherwise connected to head 381, but hub 385 allows for an easy and reliable connection between head 381 and handle 382. Hub 385 provides a ferrule into which one end of handle 382 is inserted and secured, e.g., by a pin. Preferably, as shown, hub 385 is situated midway along the circumference of head 381 to equally distribute torque generated by pivoting handle 382.

Handle 382 may be a simple bar or pipe, but preferably it is a "cheater" handle as shown in FIGS. 8-9. That is, handle 382 comprises a first length of pipe 383 telescoped within a second length of pipe 384. An array of holes 386 are spaced laterally along, for example, lower, inner pipe 383. Holes 386 extend perpendicularly through inner pipe 383. A single hole extends perpendicularly through the lower end of upper, outer pipe 384. Thus, the overall length of handle 382 may be adjusted by selectively aligning hole in outer pipe 384 with one of holes 386 in inner pipe 383 and inserting an engaging member, such as pin 387, through the outer pipe hole and selected hole 386. If union nut 360 is stuck on union 320, for example, a worker can cheat by extending the length of handle 382 to provide more leverage on union nut 360. Of course, other arrangements of holes may be provided, as may other means of selectively locking inner pipe 383 and outer pipe 384.

It will be appreciated that the novel union nuts and wrenches can allow for safer, more reliable make up and break down on unions. It is not necessary for workers to hammer the union nut, thereby eliminating the risks inherent in that practice both to the worker and to the integrity of the union.

The novel unions have been described in the context of pup joints. While pup joints are a common flowline component, the novel unions may be incorporated into many different flowline components, such as fittings, monitoring equipment, and control devices, and equipment, such as manifolds, which have conventionally incorporated hammer unions. Most such components are provided with a central bore allowing for the passage of fluid. Some components, however, may lack a bore in the sense that fluid is not intended to flow through them. For example, a plug may be provided with a male or female sub to allow a branch of a tee to be shut off. Moreover, the pup joints exemplified herein and many other flowline components have an overall, generally cylindrical shape. Fittings, monitoring equipment, and the like, however, may have a generally prismatic body. The novel unions and subs may be provided on such "block" components, for example, by machining a male sub or a female sub on a cuboid body. All such apparatus shall be considered a flowline component for purposes of the subject invention. Details of the construction and operation of such flowline components are well known in the art and will not be expounded upon.

Likewise, the novel unions have been described in the context of frac systems. While frac systems in particular and the oil and gas industry in general rely on many components having hammer unions, the novel unions are not limited to such applications or industries. Suffice it to say that the novel unions have wide applicability wherever hammer unions have been conventionally applied.

While this invention has been disclosed and discussed primarily in terms of specific embodiments thereof, it is not intended to be limited thereto. Other modifications and embodiments will be apparent to the worker in the art.

What is claimed is:

1. A hammer union joining components of a flow line, said union comprising a male sub of a first said component and a female sub of a second said component:
    (a) said male sub comprising a male end of said first component and an annular boss extending radially outward around a union face of said male end, said boss providing a rearward-facing shoulder;
    (b) a segmented retainer collar comprising a plurality of segments carried on said male end, said collar having a forward-facing shoulder and a rearward-facing shoulder, said collar forward-facing shoulder bearing on said male end rearward-facing shoulder;
    (c) said female sub comprising a female end of said second component, said female end having external threads; and
    (d) a union nut, said union nut (i) being carried on said male end around said collar, (ii) having internal threads engaging said external threads on said female end, and (iii) having a forward-facing shoulder, said nut forward-facing shoulder bearing on said collar rearward-facing shoulder;
    (e) wherein said nut forward-facing shoulder and said collar rearward-facing shoulder are beveled whereby load from said union nut is transmitted through said collar axially to said annular boss and radially inward to said male end; and
    (f) wherein said collar forward-facing shoulder and said boss rearward-facing shoulder are substantially perpendicular to a central axis of said union whereby load from said union nut is transmitted through said collar axially to said annular boss.

2. The union of claim 1, wherein said mating beveled shoulders have an angle of from about 10° to about 45° off perpendicular.

3. The union of claim 1, wherein said male end has an elongated annular recess adjacent to said annular boss and extending axially rearward along said male end and wherein said collar is carried in said recess.

4. The union of claim 3, wherein said recess terminates proximate to a rear end of said collar such that said collar is substantially restricted from sliding axially within said recess.

5. The union of claim 1, wherein said collar comprises a plurality of cylindrical retainer segments and said retainer segments are secured by a retainer ring.

6. The union of claim 1, wherein said annular boss provides an annular, metal primary bearing surface substantially perpendicular to said union central axis and a union face of said female end provides an annular, metal primary bearing surface substantially perpendicular to said union central axis, said primary bearing surface of said male sub bearing directly on said primary bearing surface of said female sub.

7. The union of claim 6, wherein said primary bearing surface on said annular boss extends radially at least along the radial height of said collar forward-facing shoulder.

8. The union of claim 6, wherein said primary bearing surfaces of said male and female ends extend radially across at least 50% of the radial extent of said union face of said male end.

9. The union of claim 6, wherein said female end has an elastomeric seal and said male end has an annular boss extending axially from said primary bearing surface, said annular boss providing a secondary bearing surface bearing on said elastomeric seal.

10. The union of claim 1, wherein said female end has an elastomeric seal disposed in an annular recess in said female end, said seal recess having a substantially uniform diameter.

11. The union of claim 10, wherein the diameter of a conduit passing through said second component is substantially uniform and the inner diameter of said elastomeric seal is substantially equal to the diameter of said conduit.

12. The union of claim 1, wherein said union comprises a wear sleeve.

13. The union of claim 12, wherein said female sub has a wear sleeve disposed in a recess in said female end.

14. The union of claim 12, wherein said wear sleeve is composed of a metal selected from the group consisting of tungsten carbide steel alloys, borided steel, carburized steel, stainless steel, and diamond coated steel.

15. The union of claim 12, wherein said female end has an elastomeric seal disposed in an annular recess in said female end and said wear sleeve is disposed axially inward of said elastomeric seal.

16. A flow line comprising the union of claim 1.

17. The flow line of claim 16, wherein said flow line is incorporated into a system for fracturing a well.

18. A flowline component comprising a male sub, said male sub being adapted for coupling with a female sub of a second flowline component to form a hammer union, wherein said male sub comprises;
　(a) a male end of said component;
　(b) an annular boss extending radially outward around a union face of said male end, said boss providing a rearward-facing shoulder;
　(c) a segmented retainer collar comprising a plurality of segments carried on said male end, said collar having a forward-facing shoulder and a rearward-facing shoulder, said collar forward-facing shoulder bearing on said male end rearward-facing shoulder; and
　(d) a union nut, said union nut (i) being carried on said male end around said collar, (ii) having internal threads adapted to engage external threads on said female sub, and (iii) having a forward-facing shoulder, said nut forward-facing shoulder bearing on said collar rearward-facing shoulder;
　(e) wherein said nut forward-facing shoulder and said collar rearward-facing shoulder are beveled whereby load from said union nut is transmitted through said collar axially to said annular boss and radially inward to said male end; and
　(f) wherein said collar forward-facing shoulder and said boss rearward-facing shoulder are substantially perpendicular to a central axis of said male end whereby load from said union nut is transmitted through said collar axially to said annular boss.

19. A flowline component comprising a male sub or a female sub, said subs being adapted for coupling with, respectively, a female sub or a male sub of a second flowline component to form a hammer union, wherein:
　(a) said male sub comprises:
　　i) a male end of said component;
　　ii) an annular boss extending radially outward around a union face of said male end, said boss providing a rearward-facing shoulder and an annular, metal primary bearing surface substantially perpendicular to a central axis of said male end;
　　iii) a segmented retainer collar comprising a plurality of segments carried on said male end, said collar having a forward-facing shoulder and a rearward-facing shoulder, said collar forward-facing shoulder bearing on said male end rearward-facing shoulder; and
　　iv) a union nut, said union nut (i) being carried on said male end around said collar, (ii) having internal threads, and (iii) having a forward-facing shoulder, said nut forward-facing shoulder bearing on said collar rearward-facing shoulder;
　　v) wherein said nut forward-facing shoulder and said collar rearward-facing shoulder are beveled whereby load from said union nut is transmitted through said collar axially to said annular boss and radially inward to said male end; and
　　vi) wherein said collar forward-facing shoulder and said boss rearward-facing shoulder are substantially perpendicular to said male end central axis whereby load from said union nut is transmitted through said collar axially to said annular boss; and
　(b) said female sub comprises a female end of said component, said female end having (i) external threads adapted for engagement by said internal threads of said union nut, and (ii) a union face providing an annular, metal primary bearing surface substantially perpendicular to said male end central axis, said primary bearing surface of said male sub adapted to bear directly on said primary bearing surface of said female sub.

20. The flowline component of claim 19, wherein said primary bearing surface on said annular boss extends radially at least along the radial height of said collar forward-facing shoulder.

21. The flowline component of claim 19, wherein said primary bearing surfaces of said male and female ends extend radially across at least 50% of the radial extent of said union face of said male body.

22. A method of assembling a flow line using a hammer union, said method comprising:
　(a) providing a first flowline hammer union component having a male sub, said male sub comprising:

i) a male end of said first component;
ii) an annular boss extending radially outward around a union face of said male end, said boss providing a rearward-facing shoulder;
iii) a segmented retainer collar comprising a plurality of segments carried on said male end, said collar having a forward-facing shoulder and a rearward-facing shoulder, said collar forward-facing shoulder bearing on said male end rearward-facing shoulder; and
iv) a union nut, said union nut (i) being carried on said male end around said collar, (ii) having internal threads, and (iii) having a forward-facing shoulder, said nut forward-facing shoulder bearing on said collar rearward-facing shoulder;
v) wherein said nut forward-facing shoulder and said collar rearward-facing shoulder are beveled whereby load from said union nut is transmitted through said collar axially to said annular boss and radially inward to said male end; and
vi) wherein said collar forward-facing shoulder and said boss rearward-facing shoulder are substantially perpendicular to a central axis of said male end whereby load from said union nut is transmitted through said collar axially to said annular boss;
(b) providing a second flowline hammer union component having a female sub, said female sub comprising a female end of said second component having external threads adapted for engagement by said internal threads of said union nut; and
(c) joining said first and second flowline components by threading said union nut of said male sub of said first component onto said female end of said female sub of said second component to form a hammer union.

23. The flowline component of claim 18, wherein said mating beveled shoulders have an angle of from about 10° to about 45° off perpendicular.

24. The flowline component of claim 18, wherein said male end has an elongated annular recess adjacent to said annular boss and extending axially rearward along said male end and wherein said collar is carried in said recess.

25. The flowline component of claim 24, wherein said recess terminates proximate to a rear end of said collar such that said collar is substantially restricted from sliding axially within said recess.

26. The flowline component of claim 18, wherein said collar comprises a plurality of cylindrical retainer segments and said retainer segments are secured by a retainer ring.

27. The flowline component of claim 18, wherein said annular boss provides an-annular, metal primary bearing surface substantially perpendicular to said component central axis and adapted to bear on a primary bearing surface of said female sub of said second flowline component.

28. The flowline component of claim 27, wherein said primary bearing surface on said annular boss extends radially at least along the radial height of said collar forward-facing shoulder.

29. The flowline component of claim 27, wherein said primary bearing surfaces of said male end extends radially across at least 50% of the radial extent of said union face of said male end.

30. The flowline component of claim 27, wherein said male end has an annular boss extending axially from said primary bearing surface, said annular boss providing a secondary bearing surface adapted to bear on an elastotneric seal of said female sub of said second flowine component.

* * * * *